(12) United States Patent
Hildreth et al.

(10) Patent No.: US 6,348,112 B1
(45) Date of Patent: Feb. 19, 2002

(54) METHOD FOR MANUFACTURING A TRAILER HITCH ASSEMBLY

(75) Inventors: Brian S. Hildreth, Plymouth; Mark Lawrence Bewick, Farmington Hills, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/477,884

(22) Filed: Jan. 5, 2000

(51) Int. Cl.[7] .................................................. C21D 8/00
(52) U.S. Cl. .......................... 148/658; 148/649; 148/654
(58) Field of Search ................................ 148/658, 649, 148/654

(56) References Cited

U.S. PATENT DOCUMENTS 6,010,142 A * 1/2000 McCoy et al. ........... 280/490.1

* cited by examiner

Primary Examiner—Deborah Yee
(74) Attorney, Agent, or Firm—Larry I. Shelton

(57) ABSTRACT

Disclosed is a method of making a trailer hitch assembly for use with automobiles, trucks and other vehicles. The trailer hitch assembly comprises a crossbeam assembly and a pair of side brackets disposed on opposite ends of the crossbeam assembly. The crossbeam assembly and the side brackets are made of an ultra-high-strength steel material having a bainitic microstructure. The trailer hitch is fabricated from boron steel preheated to a temperature in the austenite range. The steel is then formed while in the austenite range in a forming die then subsequently quenched to achieve a bainitic microstructure and assembled as a trailer hitch.

15 Claims, 2 Drawing Sheets

METHOD FOR MANUFACTURING A TRAILER HITCH ASSEMBLY

TECHNICAL FIELD

The present invention relates to a trailer hitch assembly for use with a truck and a method for making the same and, more particularly, relates to a trailer hitch assembly comprising bainitic parts and a method for making the same.

BACKGROUND ART

Trailer hitch assemblies for connecting a vehicle, such as a truck with a trailer are well known. Trailer hitches connect automobiles, trucks and other vehicles to items such as campers, small boats, and other loads. The trailer hitch assembly is usually attached to the frame of the vehicle.

Because the loads on the trailer are usually items which are relatively heavy, such as boats and the like, the trailer hitch assembly must be able to withstand compressive and tensile loads according to SAE test method J684. Typically, a trailer hitch assembly must be capable of pulling a load equal to at least one and one-half times the weight of the trailer. A common problem associated with trailer hitch assemblies is that potholes and uneven road surfaces create a great deal of wear and tear on the trailer hitch assembly, which could result in eventual fracture of the trailer hitch.

Conventional trailer hitch assemblies comprise a horizontally extending crossbar disposed between a pair of side brackets. The side brackets mount to the frame of the vehicle. The crossbar is coupled with a receiver which operates to couple the trailer to the hitch assembly.

Conventional trailer hitch assemblies have been made by cold formed steel square tubes having a uniform cross-section. The steel used for the crossbar has conventionally been SAE 1010 or SAE 1020 steel which consists essentially of iron, carbon, silicon, manganese, phosphorus, sulfur and chromium. The side brackets of a conventional trailer hitch assembly are also made of conventional SAE 1010 or SAE 1020 steel. The side brackets are welded to opposite ends of the crossbar.

These conventional cold formed tube trailer hitch assemblies are limited to a specific geometric configuration. Moreover, the process requires that these cold formed tube trailer hitch assemblies have a uniform cross-sectional width. Also, the microstructure of these trailer hitch assemblies is primarily ferrite.

It would be desirable to provide a trailer hitch assembly which is lighter and less expensive than the conventional trailer hitch assemblies without foregoing any of the structural strength of the trailer hitch assembly, i.e., still having a capability of withstanding the typical compressive and tensile loads required of trailer hitch assemblies. It would also be desirable to provide a trailer hitch assembly which is able to have varied cross-sections. Furthermore, it would be desirable to have a process that allows for the steel to be formed in a variety of geometric configurations and uses less starting material.

DISCLOSURE OF INVENTION

Accordingly, it is an object of the present invention to provide a method of making trailer hitches that while, using lesser starting material, produces a product at least as strong as conventionally manufactured trailer hitches.

It is a further object of the present invention to provide a trailer hitch assembly which is lighter than conventional trailer hitch assemblies without sacrificing any of the structural strength of the trailer hitch assembly, i.e., still having a capability of withstanding compressive and tensile loads as specified by SAE test method J684.

It is yet a further object of the present invention to provide a trailer hitch assembly which is able to have varied cross-sectional dimensions to provide strength where maximally needed.

The above and other objects of the present invention are met by providing a trailer hitch assembly that comprises a crossbeam assembly, and a pair of side brackets disposed on opposite ends of the cross-beam assembly. The crossbeam assembly and the side brackets are made of boron steel having a bainitic microstructure.

In another aspect of the present invention, a method of making a trailer hitch assembly for use with a vehicle is provided. The trailer hitch assembly comprises a plurality of trailer hitch parts comprising a crossbeam assembly and a pair of side brackets disposed on opposite ends of the crossbeam assembly. Each of the trailer hitch parts are made by preheating ultra-high-strength boron steel to the austenite range, forming the preheated steel while in its austenite range to the shape of the desired trailer hitch assembly part, and quenching the formed part to yield a part having a bainitic microstructure.

In yet another aspect of the present invention, a method is provided for manufacturing a trailer hitch assembly comprising a crossbeam assembly and a pair of side brackets disposed on opposite horizontal ends of the crossbeam assembly. The method comprises preheating a first blank of boron steel to the austenite range. The blank, while in the austenite range, is then formed into a horizontally extending U-shaped member. The horizontally extending U-shaped member is then quenched to its bainitic microstructure. A second blank of boron steel is preheated to its austenite phase. The second blank of boron steel, while in the austenite range, is formed into a reinforcing bar. The reinforcing bar is then quenched to its bainitic microstructure. The reinforcing bar is then secured to the channel to form a crossbar assembly. A third blank of boron steel is preheated to the austenite range. The third blank, while in the austenite range, is formed into at least one side bracket. The side bracket is quenched to its bainitic microstructure. The first side bracket and a second side bracket are then secured to opposite ends of the crossbeam assembly.

BEST MODE FOR CARRYING OUT THE INVENTION

Figure 1:
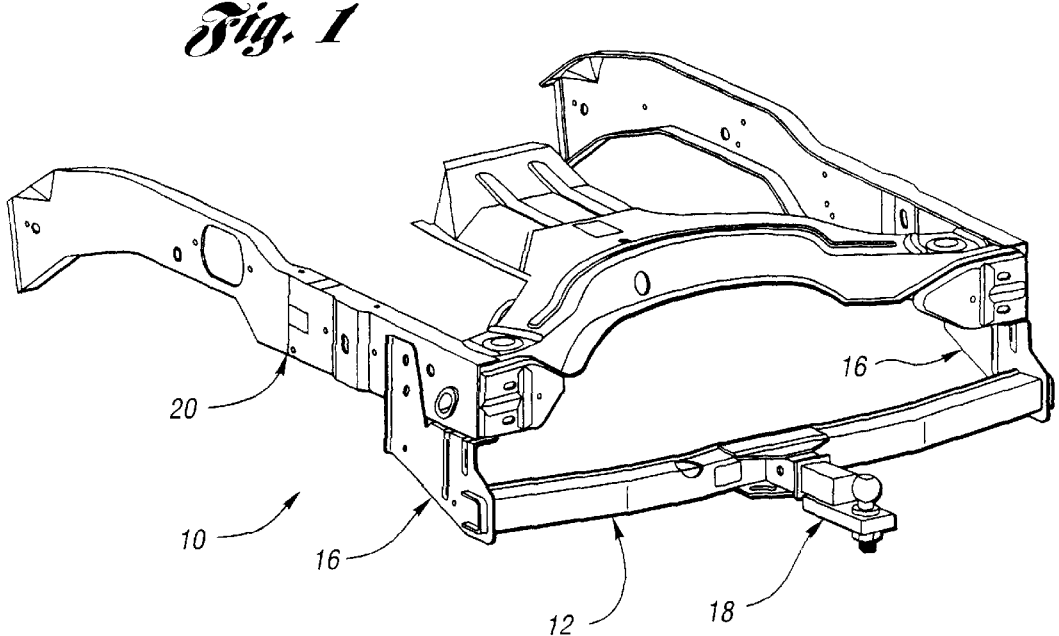
FIG. 1 a perspective view of a trailer hitch assembly attached to a vehicle frame.

FIG. 1 depicts a trailer hitch assembly 10 comprising a crossbeam assembly 12, a pair of side brackets 16, and a hitch 18. The trailer hitch assembly 10 is attachable to a vehicle frame 20 for providing attachment to a trailer (not shown). The trailer hitch assembly 10 may be designed for use in a variety of vehicle types, including campers, passenger cars, sports utility vehicles and the like.

The crossbeam assembly 12 and the side brackets 16 of the trailer hitch assembly 10 are made from ultra-high-strength steel which, in the preferred embodiment, is boron steel. The parts of the trailer hitch assembly 10 which are made from boron steel are heat treated (i.e., formed into the desired shape while heated to the austenite range and subsequently quenched to the bainitic range).

Figure 2:
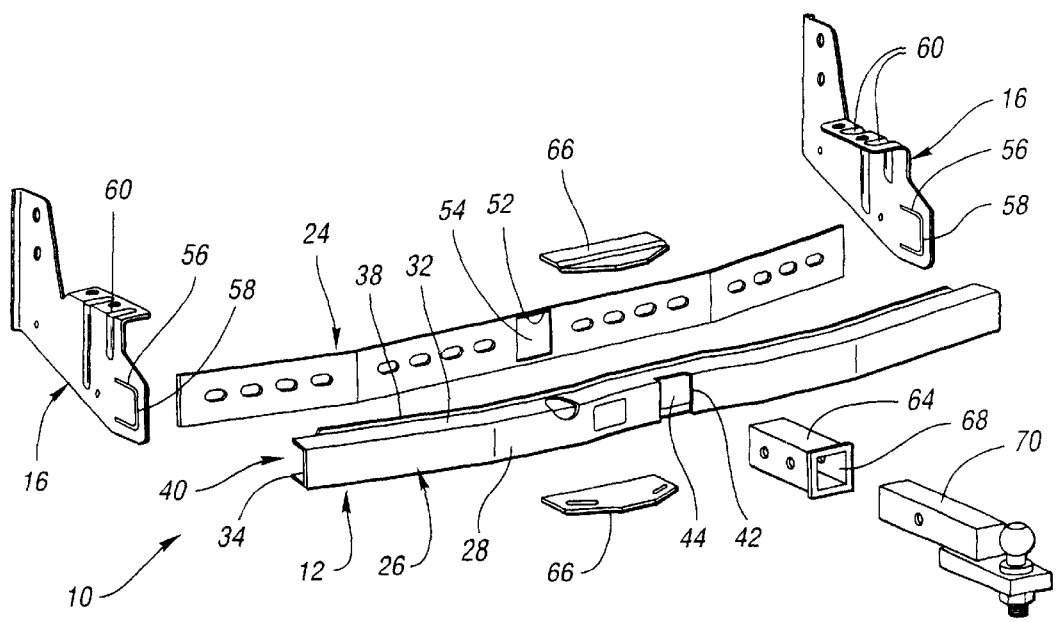
FIG. 2 is an exploded view of a trailer hitch assembly of the present invention.
Figure 3:
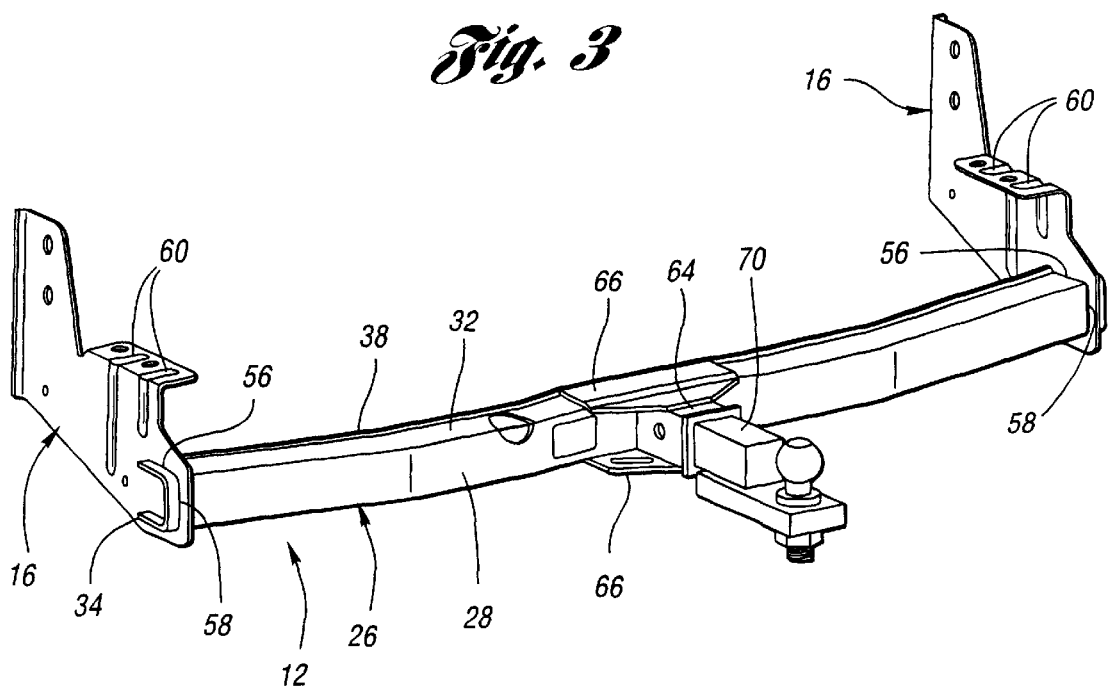
FIG. 3 is a perspective view of the trailer hitch assembly shown in FIG. 2 in its assembled condition.

Referring to FIGS. 2 and 3, the trailer hitch assembly 10 is illustrated in more detail. The crossbeam assembly 12 comprises a reinforcement bar 24 attached to crossbeam 26. The crossbeam 26 has a generally U-shaped cross-section.

The crossbeam 26 is defined by a first generally horizontally extending portion 28. The crossbeam 26 has a first leg 32 depending from a first end of the generally horizontally extending portion 28 and a second leg 34, opposite the first leg 32, extending from the opposite end of the generally horizontally extending portion 28. Each leg 32 and 34 extends essentially perpendicularly from the generally horizontally extending portion 28.

Each leg 32 and 34 include a lip portion 38 (only one of which is shown) which extends from the distal end of the respective leg portions 32 and 34. The lip portions 38 are in a plane which is parallel to the plane of the generally horizontal extending portion 28. The generally horizontally extending portion 28 and the legs 32 and 34 define an opened U-shaped channel 40.

The crossbeam 26 includes a continuous surface 42 defining a generally square opening 44. The crossbeam 26 preferably has varying widths (i.e., cross-sections) throughout its horizontal extent.

The reinforcement bar 24 is secured to the edges of the legs 32 and 34, and preferably the lip portions 38 as well, of the crossbeam 26 to close the open channel 40 of the crossbeam. The reinforcement bar 24 includes a continuous surface 52 which defines a generally square opening 54. The generally square opening 54 is aligned with the generally square opening 44 of the crossbeam 26 when the reinforcement bar 24 is secured to the crossbeam 26. The reinforcement bar 24 is secured to the crossbeam 26 by any conventional method known in the art, and is preferably secured by TIG welding.

The side bracket 16 is secured to opposite ends of the crossbeam 26 by any conventional method known in the art, and preferably by TIG welding. Each side bracket 16 is securable to opposite ends of the vehicle frame 20 to secure the hitch assembly 10 to the vehicle. Each side bracket 16 comprises a plate member including a continuous surface 56 which defines a slot 58. As shown in FIG. 2, the side brackets 16 may include ribs 60 which impart additional strength to the trailer hitch assembly. The ribs 60 is an example of the unique geometric configuration obtained by the fabrication method described herein.

The hitch assembly 10 further includes a receiver 64 and brackets 66 for securing the receiver 64 to the crossbeam assembly 12. The receiver 64 is disposable within the openings 44 and 54, respectively. The receiver 64 is preferably secured to the crossbeam 26 and the reinforcement bar 24 by any method known in the art, and is preferably secured by TIG welding.

The receiver 64 includes an opening 68 which receives a draw bar of a hitch 70. The draw bar of the hitch 70 is securable to the receiver 64 by at least one reinforcement pin (not shown).

The parts of the hitch assembly 10, and preferably, at least the side brackets 16, the crossbeam 26 and the reinforcing bar 24 are all made of a ultra-high-strength steel material which is then transformed via heat treatment to its bainitic microstructure. The ultra-high-strength steel can be any ultra-high-strength steel capable of being transformed to its bainitic microstructure, but is preferably boron steel. Most preferably, the ultra-high-strength steel usable with the present invention comprises (wt. % basis) carbon 0.2–0.25%, silicon, 0.20–0.35%, manganese 1.0–1.3%, phosphorous 0.0–0.03%, sulfur 0.0–0.025%, chromium 0.15–0.25%, boron 0.003–0.006% with the balance being iron.

The microstructure of the final product consists principally of bainite. More particularly, the microstructure of the heat treated hitch assembly parts comprises at least about 70% bainitic, more preferably between about 80–100% bainite, and most preferably at least about 90–95% bainite.

Figure 4:
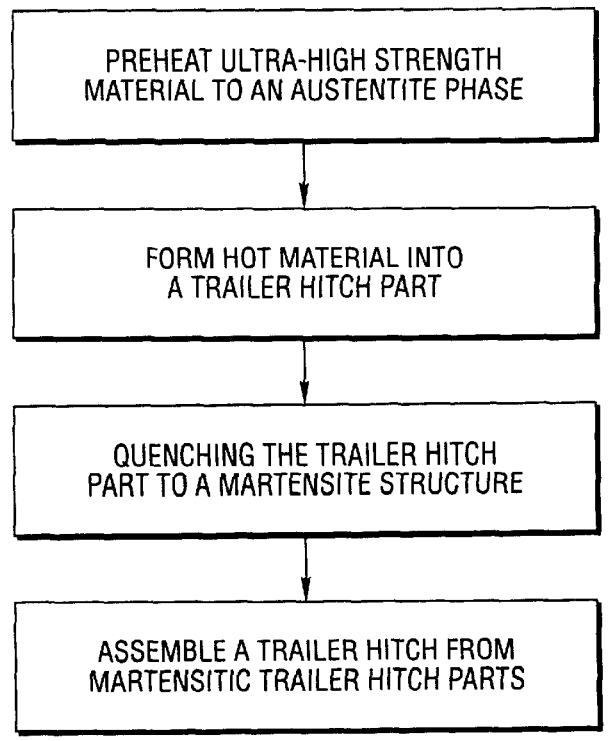
FIG. 4 is a flow diagram of the processing steps of the present invention used to make the trailer hitch assembly of the present invention.

Referring to FIG. 4, the process by which the heat-treated, bainitic parts of the hitch assembly 10 are formed is illustrated.

Ultra-high-strength steel sheets, preferably pre-stamped blank(s), required to make the trailer hitch assembly part (crossbeam 26, reinforcement bar 24, and/or side brackets 16) are preheated to the austenite range. The atmospheric conditions required to preheat the ultra-high-strength steel sheet(s) to the austenite range vary depending upon the exact composition of the material and the size and geometry of the sheets. However, at a minimum, the material must be heated to above at least about 1650 EF. in order to reach its austenite phase. Preferably, the ultra-high-strength steel material is heated in a nitrogen-rich atmosphere to at least between about 1,650 EF.–2,200 EF., more preferably between about 1,700 EF.–2,100 EF., and most preferably between about 1,750 EF.–1,950 EF.

While being at a temperature above about 1,650 EF. (i.e., in the austentite range), the preheated steel material is then formed into the desired shape of the trailer hitch assembly part. For instance, if the trailer hitch assembly part being manufactured is the crossbeam 26, the preheated material is formed in the shape of the crossbeam 26. The material can be formed in any suitable manner. Preferably, the preheated material is formed in a stamping die. Other suitable methods for which the preheated material may be formed include extrusion.

After the preheated material is formed, the formed part is then quenched to achieve a bainitic microstructure in the ultra-high-strength steel. The atmospheric conditions required to quench the formed parts to achieve a bainitic microstructure vary depending upon the exact composition of the part and the size and geometry of the parts. However, at a minimum, the part must be brought to a temperature below about 400 EF., and is preferably brought to a temperature of about less than 160 EF., and is most preferably brought to a temperature of about room temperature.

In a preferred embodiment, the trailer hitch parts are formed in a stamping die and the quenching takes place in the stamping die before the formed part is removed from the stamping die. In this embodiment, most preferably, the stamping die is water cooled to aid in the quenching of the formed part.

In an alternative embodiment, quenching may take place outside a stamping die by conventional quenching methods, such as quenching in a pool of water.

The process of the present invention produces a trailer hitch assembly 10 made from ultra-high-strength boron steel that provides high tensile strength while maintaining the requisite ductibility in the final product which may have varying cross-sectional configurations. The trailer hitch assembly 10 made by the process of the present invention is able to withstand compressive and tensile loads according to SAE test method J684. The heating followed by the quenching process results in a hot formed part which has a 165 ksi yield strength and a 220 ksi tensile strength and it allows the use of thinner materials which results in an overall weight and costs savings compared to conventional trailer hitches.

As alluded to above, it is desirable to design cross-sectional configurations such that different sections of the trailer hitch assembly 10 have different cross-sectional dimensions. In particular, it is desirable for crossbeam 26 to have different thicknesses, with the fabrication method described, such flexibility in cross-sectional dimensions is possible. The thickness of crossbeam 26 preferably may vary from about 2.8 inches to about 3.1 inches. Also, in FIG. 2, the side bracket 40 has ribs 46 which provide for added strength.

After the trailer hitch parts are formed, they are assembled in the following manner. The reinforcement bar 24 is first welded to the open-faced end of the crossbeam 26 to close the open channel. The ends of the crossbeam 26 are inserted through the slot 58 in a respective side bracket 16. The side brackets 16 and the crossbeam 26 are then welded at their connection points. The receiver 64 and brackets 66 are then welded to the crossbeam 26 and reinforcement bar 24. The draw bar of the hitch 70 is then inserted within the opening 68 of receiver 64 and secured thereto. The trailer hitch assembly 10 is then secured to the frame 20 by securing the side brackets 16 to opposite ends of the frame 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a trailer hitch assembly for use with a vehicle, the trailer hitch assembly comprising a plurality of trailer hitch parts comprising a crossbeam assembly and a pair of side brackets disposed on opposite ends of the crossbeam assembly, each of the trailer hitch parts being made by the following method:
   preheating ultra-high-strength boron steel to the austenite range;
   forming the preheated steel while in its austenite range to the shape of the desired trailer hitch assembly part; and
   quenching the formed part to yield a part having a bainitic microstructure.

2. The method of claim 1 wherein the crossbeam assembly and the side brackets have a microstructure comprising at least about 70% bainite.

3. The method of claim 1 wherein the boron steel comprises at least about 0.003 weight percent boron, based on the total weight of the boron steel.

4. The method of claim 1 wherein the crossbeam assembly comprises an elongated U-shaped member and an elongated reinforcement bar secured to the channel member.

5. The method of claim 4 wherein the U-shaped member comprises a first generally horizontal member and a first and second leg member, the first leg member extending perpendicularly from a first edge of the first generally horizontal member and the second leg member extending perpendicularly from a second edge of the first generally horizontal member, the first generally horizontal member and the first and second leg members defining a U-shaped channel.

6. The method of claim 1 wherein the boron steel is provided in the form of a blank cut to specified lengths before preheating.

7. The method of claim 6 wherein the preheated steel blank is subjected to forming in a stamping die.

8. The method of claim 7 wherein quenching the preheated steel blank includes the step of decreasing the temperature at a rate sufficient to create a bainitic microstructure.

9. The method of claim 7 wherein quenching the hot formed stampings includes the step of quenching the formed part in the stamping die until the part reaches a temperature of less than about 400 degrees F.

10. A method for making a trailer hitch assembly comprising a crossbeam assembly and a pair of side brackets disposed on opposite horizontal ends of the crossbeam assembly, the method comprising:
   preheating a blank of boron steel to the austenite range, forming the blank into a generally horizontally extending U-shaped member, quenching the generally horizontally shaped U-shaped member to its bainitic microstructure;
   preheating a second blank of boron steel to its austenite phase, forming the second blank of boron steel into a reinforcing bar, quenching the reinforcing beam to its bainitic microstructure, securing the reinforcing bar to the U-shaped member to form the crossbar assembly; and
   preheating a blank of boron steel to its austenite phase, forming the blank of austenite steel into at least one side plate, quenching the side plate to its bainitic structure, securing the pair of side plates to the opposite ends of the crossbeam assembly.

11. The method of claim 10 wherein the crossbeam assembly and the side brackets have a microstructure comprising at least about 70% bainite.

12. The method of claim 10 wherein the boron steel comprises at least about 0.003 weight percent boron, based on the total weight of the boron steel.

13. The method of claim 10 wherein the crossbar assembly comprises an elongated U-shaped member and an elongated reinforcement bar secured to the channel member.

14. The method of claim 10 wherein the preheated steel blank is subjected to forming in a stamping die.

15. The method of claim 14 wherein quenching the hot formed stampings includes the step of quenching the formed part in the stamping die until the part reaches a temperature of less than about 400 degrees F.

* * * * *